Dec. 3, 1968  R. C. PELLMAN  3,413,869
GEARSHIFT LINKAGE

Filed March 24, 1967  3 Sheets—Sheet 2

INVENTOR:
RONALD C. PELLMAN
BY
ATTORNEYS.

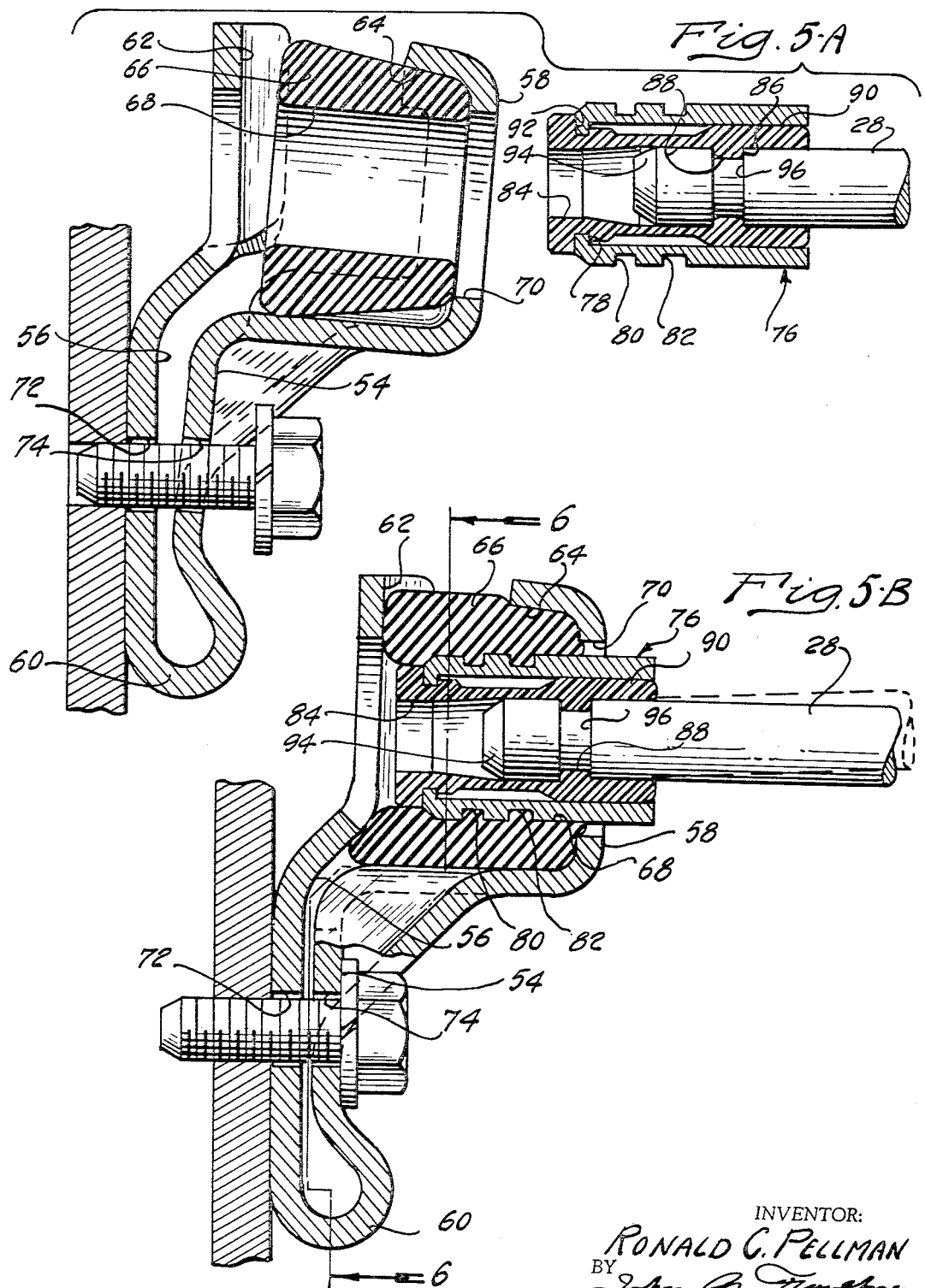

United States Patent Office 3,413,869
Patented Dec. 3, 1968

3,413,869
GEARSHIFT LINKAGE
Ronald C. Pellman, Dearborn, Mich., assignor to Ford Motor Company, Dearborn, Mich., a corporation of Delaware
Filed Mar. 24, 1967, Ser. No. 625,727
6 Claims. (Cl. 74—473)

ABSTRACT OF THE DISCLOSURE

A transmission gearshift linkage for an automotive vehicle driveline comprising a lever adapted to be mounted for pivotal movement on the stationary vehicle body or frame. The pivotal mounting structure accommodates dimensional tolerances between the linkage and the frame or body without affecting the linkage geometry.

Brief summary of the invention

My invention relates generally to remote controls for multiple-ratio, manually-controlled transmission systems in an automotive vehicle driveline. It relates more particularly to improvements in a mechanical linkage arrangement for transmitting motion from an operator controlled lever to ratio selectors in a manual transmission gear system.

Provision is made in my invention for actuating manually a transmission shift lever mounted externally of a transmission housing in an automotive vehicle driveline installation. The transmission lever is connected to a rotary transmission equalizer lever, one end of which is connected to the transmission shift lever and the other end of which is rotatably mounted and supported in an adapter that is connected directly to a fixed vehicle chassis member such as the vehicle frame side rail. The equalizer lever has secured thereto a transversely extending arm which in turn is rotated by the transmission shift rod. One end of the shift rod is connected to the base of the vehicle steering column which is supported by the vehicle frame. The steering column levers are connected to a shift tube to a driver-operated lever located within the driver's compartment of the vehicle.

In an installation of this type, the transmission housing is connected directly to the vehicle engine so that the engine and transmission form the unitary assembly that can be mounted resiliently on the vehicle frame. Engine vibrations are accommodated by the engine mounts. The transmission equalizer lever, therefore, must be capable of compensating for the vibration displacements of the transmission and engine assembly with respect to the frame to which it is journaled.

Due to installation tolerances and variations in clearances found in driveline installations, the transmission equalizer lever in conventional installations is supported by the vehicle frame and connected at its unmounted end to the transmission shift lever as explained above. The mounting means of my invention, which connects the equalizer lever to the vehicle frame, is capable of establishing a secure connection between the equalizer lever and the frame regardless of the relative axial position of the equalizer lever with respect to the frame as the transmission gear shift linkage mechanism is assembled. It is this characteristic that distinguishes my improved structure from known constructions.

The provision of a transmission linkage mechanism that is capable of fulfilling these requirements being a principal object of my invention, it is a further object of my invention to provide a transmission linkage mechanism for transmitting motion from a driver-controlled shift lever to a control element for a multiple ratio transmission wherein simple levers can be used in combination with a transmission equalizer lever with the equalizer lever mounted in such a way that angular misalignment as well as axial displacement of the equalizer lever can be accommodated.

It is a further object of my invention to provide a linkage mechanism of the type above set forth wherein the vibration of the engine and transmission assembly is isolated from the relatively stationary elements of the vehicle chassis. I contemplate further that the mounting means for the transmission equalizer lever will be capable of absorbing impact loads.

Description of the views of the drawings

FIGURES 5A and 5B are longitudinal cross-sectional views through a portion of the mounting means of FIGURES 3 and 4 as seen from the plane of section line 5B—5B of FIGURE 6. FIGURE 5A shows the parts in pre-assembled condition and FIGURE 5B shows the completed assembly;

FIGURE 6 is a sectional view taken along the plane of section line 6—6 of FIGURE 5B and FIGURE 7; and FIGURE 7 is a sectional view taken along section line 7—7 of FIGURE 6.

Particular description of the invention

Figure 1:
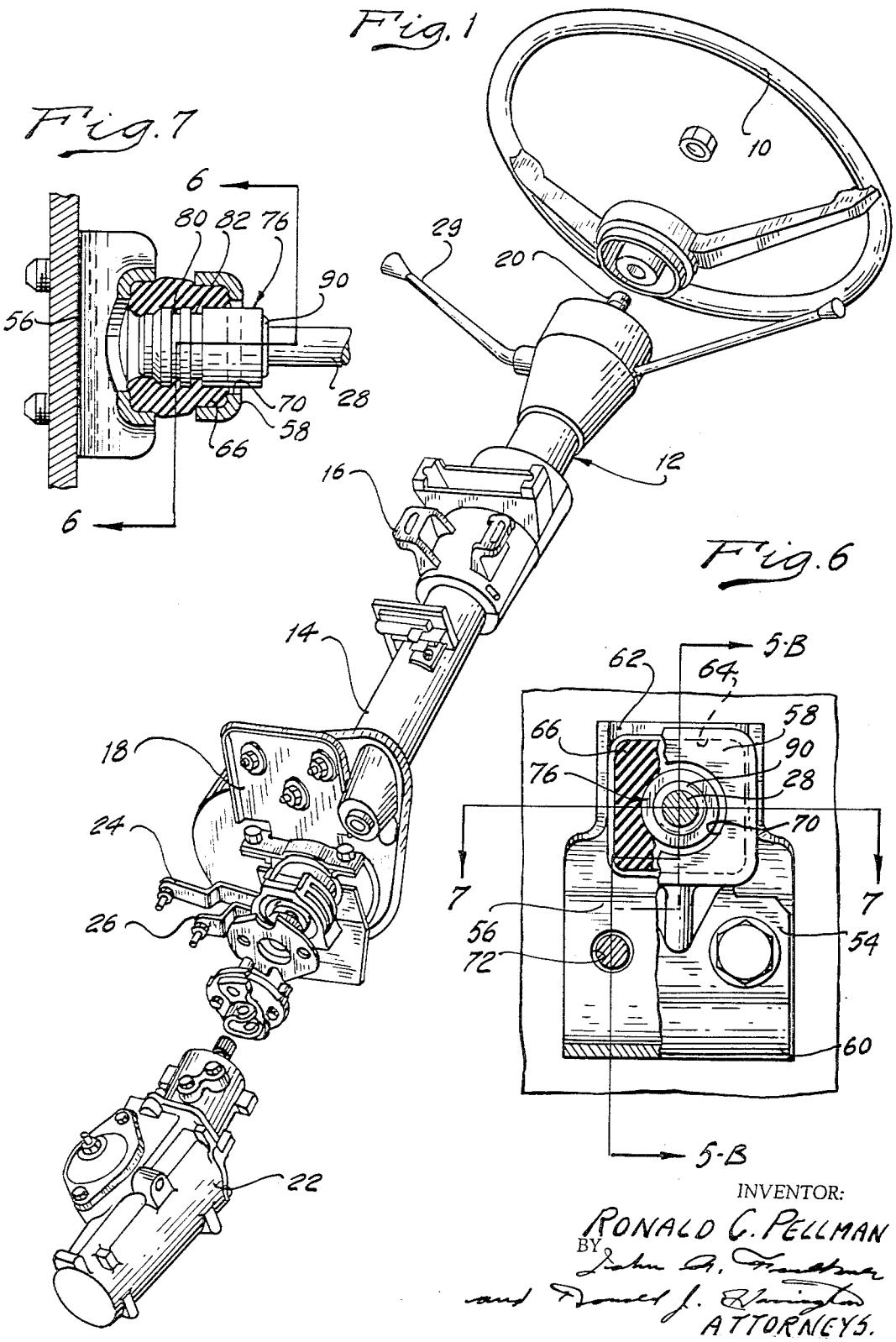
FIGURE 1 shows in isometric form a steering wheel column assembly for an automotive vehicle.

In FIGURE 1 numeral 10 designates a steering wheel which would be located in the driver's compartment of the vehicle. It is mounted on a steering column 12 which includes a statitonary column housing 14 secured by means of bracket structure 16 to the vehicle dash portion of the body structure. It is secured at its lower end to the forward wall of the vehicle body structure by means of bracket 18.

The column 14, which is hollow, encloses a steering shaft, the upper end of which is shown at 20. The lower end of shaft 20 is connected drivably to a steering gear assembly indicated generally by reference character 22. By means of a steering linkage mechanism, the driven element of the assembly is connected to the vehicle dirigible wheels.

Located also in the column housing 14 is a driver-controlled shift tube which may be coaxially mounted with respect to the steering shaft 20. The base of the shift tube is connected to shift controlling levers 24 and 26 by means of selectively engageable clutches. A transmission shift lever 29 can be shifted by the vehicle operator to cause axial movement of the shift tube as well as rotary movement thereof. Upon rotation of the shift tube, either one or the other of the levers 24 or 26 is caused to rotate about the axis of the shaft 20. The selectively engageable clutches are engaged or disengaged depending upon the axial position of the tube at the time it is rotated.

Figure 2:
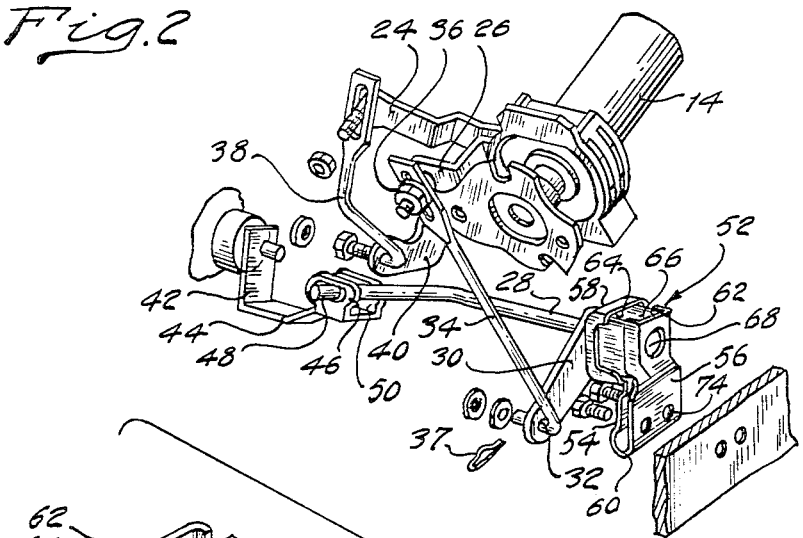
FIGURE 2 shows in isometric form a transmission shift linkage situated at the base of the steering column of FIGURE 1.

In FIGURE 2 there is shown a transmission equalizer lever 28. A crank or arm 30 is secured, preferably by welding, to the lever 28. The extended end of the arm 30 is formed with an eyelet through which end 32 of a transmission shift rod 34 extends. The end 32 can be secured in place by a pin 37 or by other fastening means. The other end of the rod 34 is joined by a threaded pin and elongated slot connection 36 to the shift lever 26 located at the base of the steering column 14. The companion shift lever 24 is connected by means of the shift rod 38 to a transmission selector lever 40. Another transmission selector lever 42, which is mounted externally of the transmission housing along with lever 40, carries an extension 44. That extension is connected by means of a lost motion joint 46 with one end of the equalizer lever 28 which carries a cross pin 48. Cross pin 48 is received within elongated slots formed in sides 50 of the extension 44.

Figure 3:
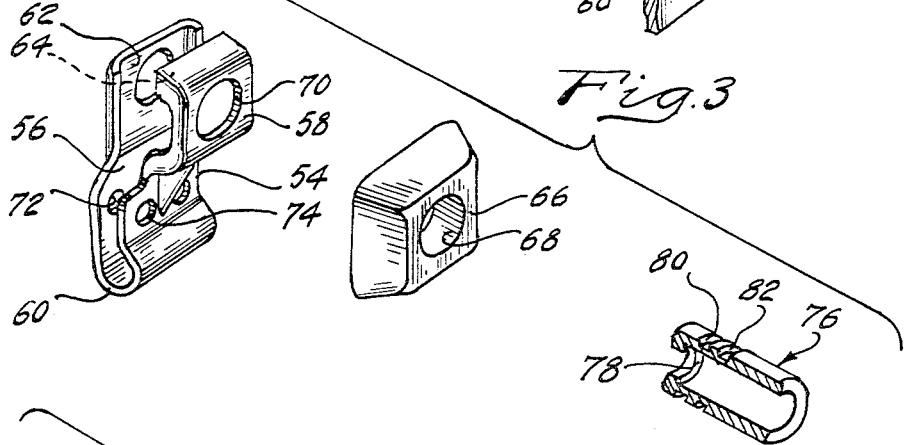
FIGURE 3 shows an exploded view of a part of the mounting means for the equalizer lever of FIGURE 2.
Figure 4:
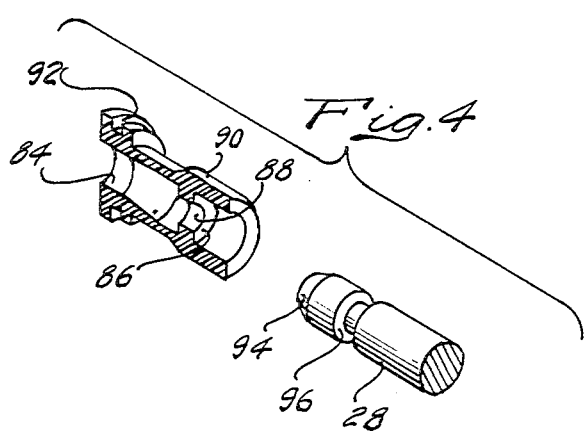
FIGURE 4 is a partial assembly view, illustrated in exploded fashion, showing another part of the mounting means for the equalizer lever of FIGURE 2.

The other end of the equalizer lever 28 is mounted on the vehicle frame by means of my improved linkage attachment identified generally by reference character 52. As seen in FIGURE 3, the linkage attachment 52 includes a bracket 54 comprised of a base plate 56 and a clamping plate 58. The plates 56 and 58 are formed from a piece of stock that is stamped and then bent at 60 so that one plate is arranged in juxtaposition with respect to the other.

The upper part 62 of the plate 56 and the upper part 64 of the plate 58 define a pocket that receives a tapered, resilient block 66, preferably formed of rubber-like material. This block is of generally square shape and is formed with tapered sides and with a central hole 68. This hole, when the block is received within the pocket defined by bracket parts 62 and 64, is in line with an opening 70 formed in plate 58.

The lower portions of plates 56 and 58 are formed with aligned openings, as shown at 72 and 74 respectively in FIGURES 5A and 5B. A second pair of such openings can be provided if desired as indicated in FIGURE 3.

Shown also in FIGURES 3, 5A, 5B and 7 is a flanged tube 76 which is of generally cylindrical shape. The left-hand margin of tube 76, as viewed in FIGURE 3, is flanged at 78. The flange extends radially inwardly toward the center of the tube. The outer margin of the tube 76 is formed with grooves, preferably two in number, as indicated at 80 and 82.

The resilient coupling element, which may be formed of a material such as urethane or hard rubber, is shown at 84. It is generally cylindrical in form and includes an internal rib 86 located in the central opening of the coupling element. The rib forms a reduced diameter central opening 88. The outer surface of the coupling element 84 is formed with a yieldable land 90 at the right-hand end thereof and with an annular groove 92 in the left-hand end thereof. The groove is defined by two annular ribs located at the left-hand end of the element 84. The diameter of the rib adjacent the end of the coupling is larger than the diameter of its companion rib.

The end of the equalizer lever 28 is chamfered, as shown at 94. Located adjacent the chamfered end 94 is an annular groove 96.

In FIGURE 5B I have illustrated the tube 76, the coupling element 84 and the shaft end in assembled relationship. The element 84 and the end of lever 28 are assembled together during the first step of the assembly process. The chamfer on the end of the lever will permit the shaft to be forced through the internal rib 88 until it assumes the position shown in FIGURE 5A. Then the resilient coupling element, which surrounds the lever end, is forced into the tube 76 until the flange 78 of the tube 76 is received within the annular groove 92. When this subassembly is completed, the internal rib on the coupling element will prevent the shaft end from becoming disassembled as an axial pull is exerted on it. The coupling element 84 can yield to permit slight axial displacement of the shaft end 28 with respect to the tube 76 since the reduced diameter center section of the coupling element can yield.

The tube 76 then can be inserted in the opening 68 in the rubber block 66. This rubber block, which is located in the retaining recess between plates 56 and 58, then encircles the annular grooves 80 and 82 of the tube 76. Clamping bolts then are inserted through the openings 74 and 72 as well as the companion openings. The bolts can be threadably received within bolt openings formed in the vehicle frame. As the clamping bolts are tightened, the bracket plates 56 and 58 are drawn together thereby compressing the block 66 and reducing the effective diameter of the opening 68. Their causes the tube 76 to be gripped by the block 66 thereby preventing its removal. The clamping occurs as the last step of the assembly process.

Variations in clearances between the transmission and the adjacent frame side member are compensated for by the ability of the block 66 to clamp the tube 76 at various axial positions thereby establishing a rigid connection between the shaft end 28 and the frame. The rubber block grips or bites into the grooves 80 and 82 of the tube 76 after the clamping bolts are tightened. Before they are tightened, however, the tube 76 can be adjusted freely within the opening 68 to the proper axial position. The shaft end 28 can rotate, however, to permit an appropriate rotary adjustment of the equalizer lever 28. This rotary motion is permitted because of the clearance provided between the rib 86 and the annular groove 96 in the end of lever 28.

Angular misalignment of the shaft with respect to the frame bracket is accommodated as the coupling element deforms. This condition is shown by means of dotted lines in FIGURE 5B.

Although I have shown a lost motion connection between the operating end of the shaft 28 and the transmission lever 42, I contemplate that this can be eliminated in certain vehicle installations where the misalignment and axial displacement of the shaft 28 during operation can be compensated for entirely by the linkage attachment of FIGURE 5B.

I claim:

1. In a linkage attachment for connecting rotatably one end of a motion transmitting lever to a relatively stationary structural member comprising a shaft, a lever secured to said shaft and extending radially therefrom, means for oscillating said lever about the axis of said shaft thereby causing rotary motion of the latter, a mounting bracket having two clamping plates, a resilient block situated between said mounting plates, an opening formed in said block, a mounting tube received through said opening, said tube being gripped by said block as said bracket plates are clamped together, clamping bolts received through said plates and threadably retained by said stationary member whereby said plates are drawn together as said bracket is secured to said stationary member by said bolts, the end of said shaft being received through said tube, and a yieldable coupling element in the form of a sleeve between said shaft end and said tube, said shaft end and said coupling element having interlocking parts whereby relative axial displacement thereof is resiliently resisted although rotary motion of said shaft end is accommodated.

2. The combination as set forth in claim 1 wherein said coupling element and said tube have interlocking parts whereby said coupling element is held in fixed relationship with respect to said tube when said shaft end is assembled in it.

3. In a manually operated shift linkage for controlling ratio shifts in a power transmission mechanism for an automotive vehicle driveline, a transmission equalizer lever, means for connecting one end of said equalizer lever to ratio controlling elements of said transmission, a crank lever secured to said equalizer lever and extending radially therefrom, a shift rod connected to the free end of said crank lever, manually operated lever means for adjusting said shift rod in a direction transverse to the direction of the axis of said equalizer lever, means for mounting the other end of said equalizer lever rotatably on a stationary member, said mounting means comprising a bracket, said bracket having a pair of clamping plates, clamping means for clamping said plates to said stationary member thereby securing said bracket in fixed relationship with respect to said transmission mechanism, a resilient block situated between said clamping plates, an opening formed in said block, a mounting tube received through said opening, said block gripping said opening when said clamping plates deform said block, said equalizer lever being received through said tube, a resilient coupling element in the form of a sleeve surrounding the end of said equalizer lever within said tube, and means for locking said resilient element to said tube and to said other lever end to resiliently resist relative axial displacement thereof.

4. The combination as set forth in claim 3 wherein said other equalizer lever end and the interior of said resilient element are formed with interlocking parts that permit relative rotation of said other shaft end and axial displacement of said other shaft end with respect to said tube.

5. The combination as set forth in claim 4 wherein the other end of said equalizer lever is chamfered to permit its assembly within said resilient coupling element prior to assembly of said coupling element within said tube.

6. The combination as set forth in claim 2 wherein the other end of said equalizer lever is chamfered to permit its assembly within said resilient coupling element prior to assembly of said coupling element within said tube.

References Cited

UNITED STATES PATENTS

| | | | |
|---|---|---|---|
| 2,297,506 | 9/1942 | Schmidt | 248—358 |
| 2,389,562 | 11/1945 | Storch | 248—358 |
| 3,123,332 | 3/1964 | Hawkins | 248—358 |
| 3,323,609 | 6/1967 | Rosenberger | 74—473 |
| 3,364,778 | 1/1968 | Griffen et al. | 74—473 |

FRED C. MATTERN, JR., *Primary Examiner.*

B. T. CALLAHAN, *Assistant Examiner.*

UNITED STATES PATENT OFFICE
CERTIFICATE OF CORRECTION

Patent No. 3,413,869 December 3, 1968

Ronald C. Pellman

It is certified that error appears in the above identified patent and that said Letters Patent are hereby corrected as shown below:

Column 4, line 40, cancel "mounting". Column 5, line 3, cancel "opening" and insert -- tube --.

Signed and sealed this 10th day of November 1970.

(SEAL)
Attest:

Edward M. Fletcher, Jr.  WILLIAM E. SCHUYLER, JR.
Attesting Officer  Commissioner of Patents